UNITED STATES PATENT OFFICE.

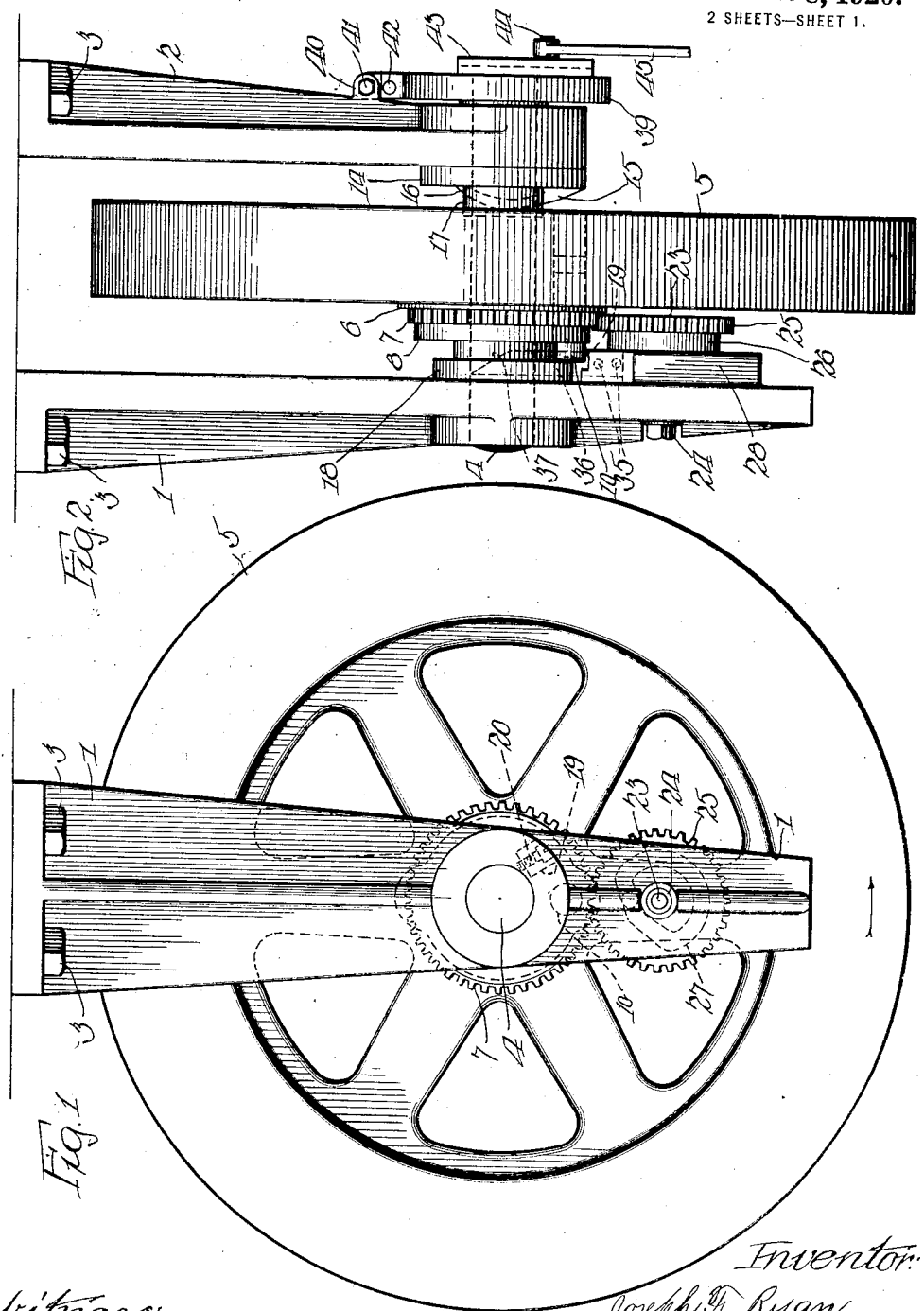

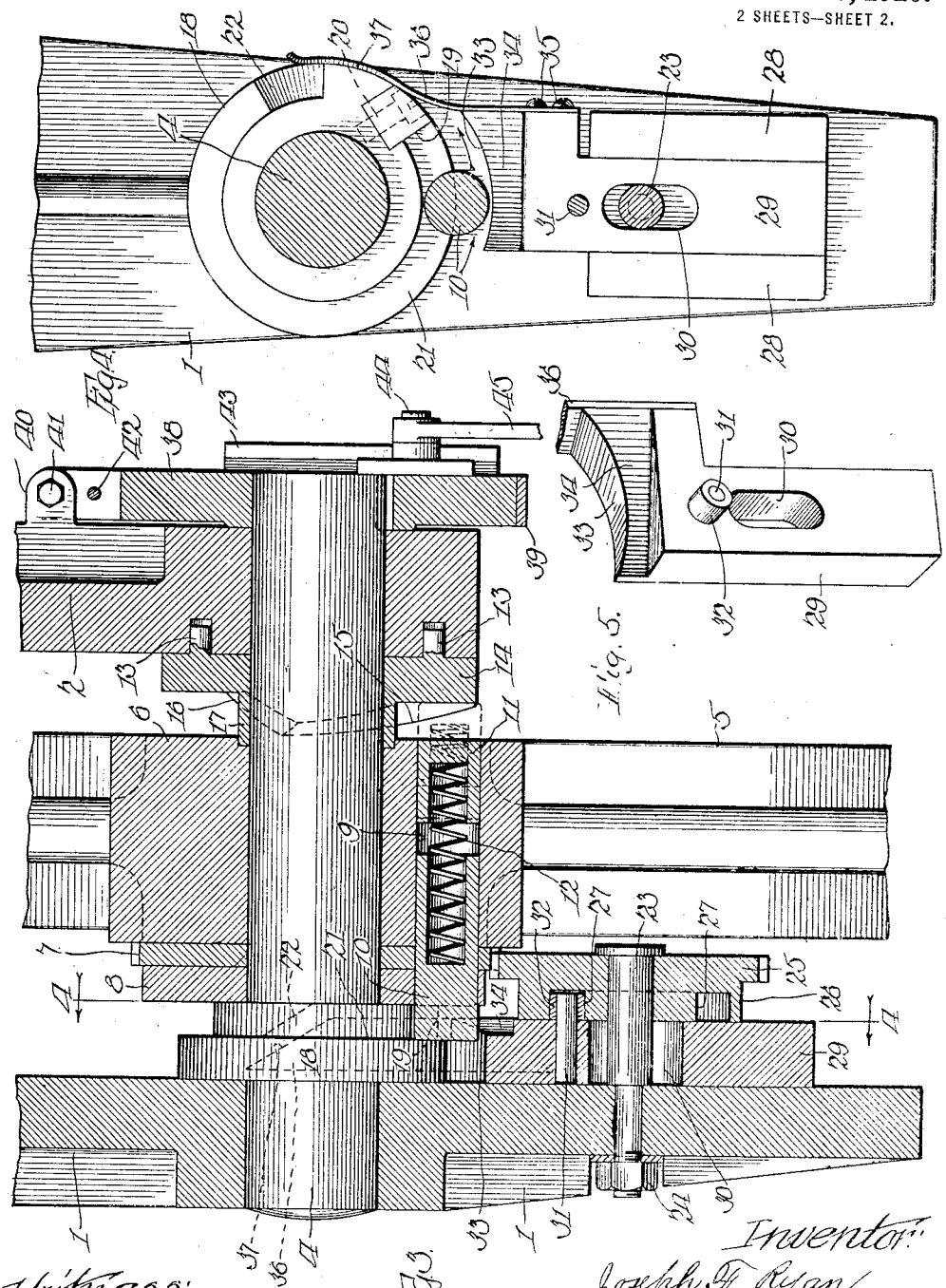

JOSEPH F. RYAN, OF CHICAGO, ILLINOIS.

CLUTCH-CONTROLLING MECHANISM.

1,342,762.  Specification of Letters Patent.  Patented June 8, 1920.

Application filed October 16, 1918. Serial No. 258,343.

*To all whom it may concern:*

Be it known that I, JOSEPH F. RYAN, a citizen of the United States, residing at Chicago, in the county of Cook and State of Illinois, have invented certain new and useful Improvements in Clutch-Controlling Mechanism, of which the following is a description, reference being had to the accompanying drawings, forming a part of this specification, in which corresponding letters of reference in the different figures indicate like parts.

The primary object of my invention, broadly stated, is to provide simple, effective and positive means for causing intermittent rotation at predetermined intervals, of a driven shaft, normally at rest, by means of a continuously rotating driving member, whereby intervening clutch-members may be thrown into and out of engagement at desired intervals for the purpose of operating a reciprocatory tool or device, such, for example, as a perforating machine, punch or other analogous mechanism.

A further object, incidental to the foregoing, is to provide yielding means in conjunction with a shiftable clutch-member, to compensate for relative changes in position and consequent conflicting action during given parts of cycles, of positive opposing means for controlling the movement of said member in its coacting relation to a counterpart clutch-member; whereby it may be moved into an engaging position at stated times and withheld therefrom at others. A still further object is to provide effective safety means for avoiding accident in case of a reversal of the driving wheel. To these ends, my invention consists in the combination of elements hereinafter more particularly described and definitely pointed out in the claims.

In the drawings,

Figure 1, is an end elevation embodying the features of my invention,

Fig. 2, is a side elevation viewed in a plane at right angles thereto,

Fig. 3, is a central vertical section,

Fig. 4, is a section taken upon the line 4—4, Fig. 3, and

Fig. 5, is a detached perspective view of the automatic clutch-pin retractor.

Referring to the drawings, 1 and 2 respectively, indicate upright supports, which, in the example illustrated, are shown in the form of hangers secured by means of bolts 3, to any suitable horizontal stationary member. A horizontal shaft 4, is journaled in suitable bearings in said supports, upon which shaft is loosely mounted a driving member in the form of a fly-wheel 5, adapted to be continuously rotated by means of a belt, not shown. Rigidly attached to one face of the hub 6 of the wheel 5, is a spur-gear 7, to which, in turn, is rigidly secured an annular disk 8, best shown in Figs. 2 and 3, the purpose of which will be presently explained. Extending through the hub 6, as well as through said gear and disk members, is a bore 9, Fig. 3, arranged parallel to the shaft 4, into which is loosely fitted a two-part clutch-pin comprising members 10 and 11, preferably circular in cross-section, the former of which, as shown, being longer than the latter. Each of said pins is provided with a longitudinal bore extending from the inner or meeting ends outwardly throughout a portion of the length thereof, into which is inserted a coiled spring 12. Said bores are of such depth respectively and said spring so formed and of such a length that when placed within said bores so that the ends of the spring will be in contact with the ends of the bores, the inner ends of the parts 10 and 11 will be separated as shown, a sufficient distance so that, for example, when the outer end of the part 11 is flush with the face of the hub toward the right, the outer end of the part 10 will project beyond the opposite face of said hub a predetermined distance toward the left as indicated, for the purpose hereinafter described; it being understood that normally, the spring is not under tension, but when pressure is simultaneously exerted in opposite directions against the ends of the parts 10 and 11, they may be moved toward each other so as to be flush with the respective faces of the hub.

Attached to the inner face of the hanger 2, by means of pins 13, is a stationary circular cam generally designated by 14, having laterally inclined cam surfaces 15 and 16 in operative proximity to the end 11, of the two-part clutch-pin. An annular sleeve-portion 17, is formed upon said cam and has its edge fitted into a groove or offset in the loose hub 6, to hold the latter against lateral movement in one direction. The cam may be termed the clutch-pin push-cam, as it acts successively upon the pin to push it into an engaging position with each revolution of the driving member.

Rigidly mounted upon the shaft 4, is a clutch member generally designated by 18, one face of which is in movable contact with the inner face of the hanger 1, while a portion of the other face is fitted to contact loosely with the face of the disk 8, as best shown in Fig. 3, to hold the hub 6 against lateral movement in that direction. A clutch-dog 19, consisting of a small block formed from hardened steel, is detachably fitted in a recess formed in the member 18 and secured in place by means of a screw 20. The annular clutch-member 18 is cut away as shown at 21, Figs. 3 and 4, around the greater portion thereof to a uniform depth, while a cam portion 22 is formed thereon, extending to a plane which is flush with the inner face of the clutch-dog and with the sleeve portion which contacts with the part 8. It will be noted that a considerable portion of the clutch-pin lies in a zone outside of the periphery of the clutch member 18. This feature involves two purposes as hereinafter explained.

Journaled upon a wrist-pin 23, which is rigidly attached to the hanger 1, by means of a nut 24, is a cam-pinion 25, which meshes with and is driven by the gear 7. With a view of controlling the relative intervals of clutch action, the diameter of the gear should exceed that of the pinion and that by a predetermined multiple, which, it should be understood, may be varied under different conditions. In the example illustrated, the relative diameters are so proportioned that the pinion will be caused to make one and one-third of a revolution to each revolution of the driving gear. Upon one face of the pinion 25 is a circular member 26, in which is formed a cam-groove 27, shown in full lines in Fig. 3 and in dotted lines in Fig. 1. A predetermined portion of said groove is concentric with the axis of the gear 25, while a lesser portion is flattened or brought nearer to said axis for the purpose hereinafter stated.

Slidably mounted in vertical bearings between guide-members 28, formed upon the inner face of the supporting member 1, Figs. 2 and 4, is a cam-controlling block 29, Figs. 3, 4 and 5, having a slot 30, formed therein to receive the wrist-pin 23, and provide for a vertical movement of the block. A wrist-pin 31, is attached to the block. Said pin is provided with a friction roller 32, adapted to enter the cam-groove 27. The upper portion of the block is made wider than the main body, as represented in Figs. 4 and 5, and is curved at its upper end as shown at 33, to conform substantially to the peripheral curve of the clutch-member 18. A lateral cam-surface 34, is formed upon the upper part of the controlling-block which surface is arranged in a plane oblique to that of the inner face of said block and is extended to a plane substantially flush with that of the inner face of the clutch-dog. Said cam, or clutch-pin retractor, is intended to be moved at predetermined intervals into and out of the path of the clutch-pin in the manner hereinafter described to retract said pin and cause it to pass the clutch-dog without engagement.

Attached to the upper part of the block 29 by means of screws 35, is a spring 36, the upper portion of which is curved to conform substantially to the peripheral curve of the clutch-member 18, but within the circular path of movement of the clutch-pin, so that said spring will be caused to yield outwardly against the action of the pin when the drive wheel is rotated in its normal direction. The upper portion of said spring is formed so that a part of its inner edge will be in a plane oblique to that of the axis of the clutch-pin, as shown at 37, Figs. 2 and 4. Said spring, having said oblique edge, is intended to act as a safety appliance in the event of a reversal of the driving-wheel from its normal direction of movement.

Keyed to the shaft 4, near its outer end adjacent to the hanger 2, is a disk 38, Fig. 3, surrounded by means of a brake-band 39, also shown in Fig. 2, in operative contact therewith, the upper portion of which is attached to a lug 40 by means of a bolt 41. A bolt 42 is passed through the parallel portions of said band and secured by means of an adjusting nut, not shown, for varying the tension and resulting friction of the brake-band upon the disk. The purpose of the brake, the construction of which is well known, is to overcome the momentum of the shaft and arrest its movement at a given point when the clutch is released.

Rigidly attached to the end of the shaft is a disk 43, having a wrist-pin 44 with which is jointedly connected a plunger 45, adapted to actuate a punch-press, perforator-head or other analogous device, not shown.

The operation of the device is as follows: The driving wheel is intended to be continuously rotated in the direction indicated by the arrow shown in Fig. 1, carrying with it the two-part clutch-pin which is free to be moved longitudinally in either direction. The direction of circular movement of said pin is indicated by the arrows shown in Fig. 4, in which the wheel is not shown.

Assuming the driven shaft 4 to be at rest, the clutch-dog 19 would be in the normal position indicated and best shown in Figs. 3 and 4. The cam-pinion 25, should be so adjusted that when the clutch-pin is in its lowermost position, the flat portion of the cam groove 27, will be uppermost, as indicated in Figs. 1 and 3, thereby depressing the cam-block 29 and causing the cam surface 34 to be moved out of the path of the clutch-pin. The latter will have been pushed to the extreme left-hand position by action of the cam 14 and spring 12 as hereinafter described, so that the end portion 10, will have been brought into operative engagement with the active face of the dog 19, thereby completing the clutching action. The continued rotation of the driving wheel will cause the shaft 4 to complete one revolution. During this period the block 29 will have been lifted by the action of the cam-member 26, into the path of the clutch-pin, so that the end of the latter will be engaged thereby, thus moving the pin to the right so that the end of the part 11 thereof will be caused to contact with the face of the cam 14. The latter cam, being stationary, serves as the wheel is rotated, to push the clutch-pin toward the left with each revolution. It is obvious that, were the pin made solid, there would be a conflict of action between it and the cams 14 and 34, which would oppose each other; hence the necessity for the two-part pin and the intervening spring 12, which enables the part 10 to be moved to the right while the part 11 is being moved to the left, so that the ends may be substantially flush with the side faces of the hub. The parts are so timed and related, that when the cam 34 is brought into action to hold the clutch-pin out of action, the end of the part 10 will be caused to ride from the cam 34 onto the end face of the dog 19 and thence on until it reaches the inclined surface 22, thereby preventing a clutching action; the part 11 being still in contact with the part 14, so as to form an abutment therefor and the spring 12 being then under tension, the part 10 will be pushed by the recoil of the spring to the extreme left where it will remain until reversed by the action of the cam 34. In the example illustrated, the cam 26 is so designed and the gears 8 and 25 so timed, that the cam 34 will be caused to remain in a raised position during two successive revolutions of the driving wheel. It is then caused to be lowered in time to permit the clutching action described during a single revolution of the shaft.

It is manifest that, were the driving wheel reversed, it would cause the clutch-pin or other parts to be broken or injured were not some provision made to avoid conflict. This is the purpose of the spring 36. So long as the clutch-pin is caused to be moved in the direction of the arrows as shown in Fig. 4, the periphery thereof will contact with the inner surface of the spring and push it out so as to permit the passage of the pin. When, however, a reversal of the wheel occurs, the end of the part 10 will be caused to contact with the inclined edge 37 of said spring and thereby be pushed back against the action of the spring 12, until it will have passed the clutch-dog and will have been moved into a non-engaging position.

The band clutch described is intended to be so adjusted as stated that the frictional action thereof will be just sufficient to arrest the movement of the shaft at the proper point in its revolution.

I do not wish to be limited to the precise construction shown inasmuch as it may be varied and its action or application modified, without departing from the spirit of the invention.

Having thus described my invention, I claim:—

1. A clutch mechanism, comprising, in combination, driving and driven members, interposed primary and secondary counterpart clutch members, one movably mounted in and carried by the driving member and the other rigid with the driven member, means for successively moving said primary clutch member into an engaging position, a movable retractor for holding said clutch-member out of engagement with its fellow when in its path of movement and cam and gear mechanism rotatively mounted upon a stationary support and in movable relation to and in operative connection with said driving member for moving said retractor independently of said clutch members into the path of said primary clutch member at predetermined intervals.

2. A clutch mechanism, comprising, in combination, a rotary driving member, a driven shaft upon which said driving member is rotatively mounted, a primary clutch-member loosely mounted in a bearing in said driving member parallel to its axis and free to be moved longitudinally therein while carried thereby in a circular path, a counterpart clutch-member upon said shaft and rigid therewith, a cam for successively moving said clutch member longitudinally in one direction to engage its counterpart, a movable retractor and cam and gear mechanism rotatively mounted upon a stationary support and in movable relation to and in operative connection with said driving member for moving said retractor independently of said clutch members into and out of the path of said primary clutch member at predetermined intervals.

3. A clutch mechanism comprising, in combination, a rotary driving member, a driven-shaft upon which said driving member is rotatively mounted, a two-part clutch-member loosely mounted in said driving member with its axis parallel to said shaft to permit longitudinal movement of said clutch-member while carried in a circular path by said driving member, yielding means between the two parts of said clutch-member to extend them longitudinally, a counterpart clutch-member rigid with said shaft, a cam for successively engaging one end of said two-part clutch member to move it longitudinally in one direction, a movable retractor for engaging the opposite end of said two-part clutch-member to hold it out of engagement with said counterpart and means in operative connection with said driving member for moving said retractor into and out of the path of said two-part clutch member at predetermined intervals.

4. A clutch mechanism, comprising, in combination rotary driving and driven members, interposed primary and secondary clutch members, the former consisting of a two-part slidable pin mounted to slide longitudinally in the hub of said driving member and having a spring between its parts to yieldingly separate them, means for successively moving said primary clutch-member into an engaging position, a retractor adapted to be moved into the path of said primary clutch member and means in operative connection with said driving member for moving said retractor into and out of the path of said primary member at stated intervals.

5. A clutch mechanism, comprising, in combination, driving and driven members, interposed primary and secondary counterpart clutch-members, one movably mounted in and carried by the driving member and the other rigid with the driven member, means for successively moving said primary clutch member longitudinally into an engaging position, a movable retractor for retracting said primary clutch-member when interposed in its path of movement, gears in operative connection with said driving member and an interposed rotary cam fixed to and driven by one of said gears independently of said clutch members and in operative connection with said retractor to move it into and out of the path of said primary clutch members.

6. A clutch mechanism comprising, in combination, rotary driving and driven members, interposed primary and secondary counterpart clutch-members, one loosely mounted in, and carried in a circular path by the driving member, the same being arranged parallel to the axis of the driven member and free to be moved longitudinally, while its counterpart is rigid with the driven member, means for successively moving said primary clutch-member longitudinally into a position to engage its fellow, a movable retractor for retracting said primary clutch-member when interposed in its path, a rotary cam for actuating said retractor and gears interposed between said cam and said driving member and adapted to actuate said retractor independently of said clutch members, said gears and cam being timed to hold said retractor in an engaging position during two revolutions of the driving member and to withhold it therefrom during a third revolution of said driving member.

7. The combination with rotary driving and driven members, the former having a hub journaled upon the latter, of interposed clutch-members, one consisting of an extensible two-part pin, the members of which are held apart by interposed yielding means, said pin having its bearing in a bore extending transversely through said hub and parallel with its axis, while the other clutch member is rigid with said driven member, a stationary cam upon one side of said hub for successively moving said pin longitudinally, an opposing retractor cam upon the opposite side of said hub and interposed means controlled by said driven member, for moving said retractor-cam into and out of the path of said clutch-pin at given intervals.

8. The combination with a driving-wheel and a driven shaft, the former being journaled upon the latter, of interposed clutch-members, one comprising an abutment upon said shaft and rigid therewith and the other an extensible, longitudinally yielding two-part clutch-pin having an interposed spring to hold it normally extended, said member being loosely mounted in a bore extending through the hub of said wheel parallel to said shaft, a stationary pin-pushing cam adjacent to said hub to move said clutch-pin in one direction with each revolution of the wheel, a movable opposing retractor-cam upon the opposite side of said hub and means controlled by said driving-wheel for moving said retractor into and out of the path of said clutch-pin at predetermined intervals.

9. The combination with a driving wheel and a driven shaft, said wheel being journaled upon said shaft, of interposed clutch-members, one comprising a rigid abutment upon said shaft and the other an extensible, longitudinally yielding, two-part clutch-pin having an interposed spring to hold it normally extended, said member being loosely mounted in a bore extending through the hub of said wheel parallel to its axis means upon one side of said hub for successively pushing said pin into an engaging position, a spring having one end secured to a stationary support upon the opposite side of said hub and bent to lie in the circular path of said pin, the same being free to yield outwardly to permit the passage of said pin when the wheel is rotated in its normal direction of movement, the free end of said spring having a diagonally formed edge to engage the end of said pin and retract it when the wheel is rotated in the wrong direction.

10. The combination with rotary driving and driven members, one loosely journaled upon the other, of interposed clutch members, one rigid with the driven member and the other in the form of a pin made to reciprocate longitudinally through the hub of the driving member, means for successively moving the same into an engaging position with each revolution of the driving member and a safety-spring located in the rotary path of said pin, to yield to the normal action of the latter and formed to engage the end thereof to retract it when the direction of movement of the driving member is reversed.

In testimony whereof, I have signed this specification in the presence of two subscribing witnesses, this 11th day of October, 1918.

JOSEPH F. RYAN.

Witnesses:
 DAVID H. FLETCHER,
 M. HARDING.